United States Statutory Invention Registration [19]

[11] Reg. Number: H309

Milberger [43] Published: Jul. 7, 1987

[54] ENERGY RECOVERABLE CHOKE FEED

[75] Inventor: Walter E. Milberger, Severna Park, Md.

[73] Assignee: The United States of America as represented by the Secretary of the Army, Washington, D.C.

[21] Appl. No.: 910,113

[22] Filed: Jan. 28, 1986

[51] Int. Cl.[4] ..... H02M 7/00; H02M 7/538

[52] U.S. Cl. ..... 363/124; 363/132; 363/40

*Primary Examiner*—Stephen C. Buczinski
*Assistant Examiner*—Linda J. Wallace
*Attorney, Agent, or Firm*—Anthony T. Lane; Harold H. Card, Jr.; Michael C. Sachs

[57] ABSTRACT

An improved choke feed is provided for minimizing the inductive fly-back voltage phenomenon at the inputs of voltage chopper circuits. By using directional shunts, fly-back energy is recovered and passed through to the chopper circuit for improved efficiency.

6 Claims, 3 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ENERGY RECOVERABLE CHOKE FEED

GOVERNMENTAL INTEREST

The U.S. Government has rights in this invention pursuant to contract number DAAK-11-81-C-0021, awarded by the Department of the Army.

BACKGROUND OF THE INVENTION

1. Field of the Invention

This invention relates to power supplies. More particularly, this invention relates to improved circuitry for use with chopper power supplies.

2. Description of the Prior Art

Chopper converter power supplies are useful for converting a D.C. input into a new D.C. voltage or an A.C. voltage of a desired frequency. This result is achieved by passing the input D.C. voltage through a series of switches thereby simulating an A.C. voltage which is impressed upon the primary of a transformer. The secondary output voltage is dependent of course upon the ratio of the number of the windings of the primary to the secondary, while the frequency of the output voltage is dependent upon the rate of switching of the input D.C. voltage. Where the chopper is driven by high frequency switching signals, an equivalent high output frequency can be achieved.

One of the primary difficulties encountered with chopper-type devices is the high fly-back voltage which appears at the inputs of the chopper circuit. More specifically, when an input to the chopper circuit makes a transition from the "on" state to the "off" state, the energy stored in the inductor feeding that input is released, resulting in an unacceptably high voltage at that input which could potentially damage the voltage chopper circuitry. One solution has been to place a series zener diode and resistor across the input choke to limit the amplitude of the fly-back voltage. While this may be effective at low chopper frequencies, the efficiency of the circuit with regard to power transmission drops as the frequency increases. Ideally, it would be desirable to capture the energy stored in the inductors and pass it through to the chopper circuit.

OBJECTS OF THE INVENTION

It is an object of the invention to provide a circuit capable of feeding a maximum amount of the energy from the power supply output through to the chopper circuit output.

It is a further object of the invention to provide an input circuit for a chopper which can operate over a wide frequency range with virtually no loss.

It is a further object of the invention to provide an input circuit for a chopper converter that provides current limiting while minimizing the inductive fly-back voltage.

It is a further object of the invention to provide an input circuit for a chopper converter which has highly reliability and high efficiency.

It is a further object of the invention to provide an input circuit for a chopper circuit which is capable of boosting the input line voltage to enhance the efficiency of converters operating from low voltage sources.

SUMMARY OF THE INVENTION

These objects as well as others not enumerated here are achieved by the invention, one embodiment of which may include an input terminal connected to two series inductive branches at their respective inputs, two directional shunt circuits connected to the outputs of the inductive branches, which in turn are connected to the inputs of a voltage chopper circuit. The directional shunt circuits serve to pass current back and forth from one side of the circuit to another as the chopper inputs switch on and off. In an ideal circuit, no energy is lost and efficiency approaches 100%.

BRIEF DESCRIPTION OF THE DRAWINGS

A more complete understanding of the present invention, as well as other objects and advantages thereof not enumerated, will become apparent upon consideration of the following detailed description, especially when considered in light of the accompanying drawings wherein.

DETAILED DESCRIPTION OF THE INVENTION

Figure 1:
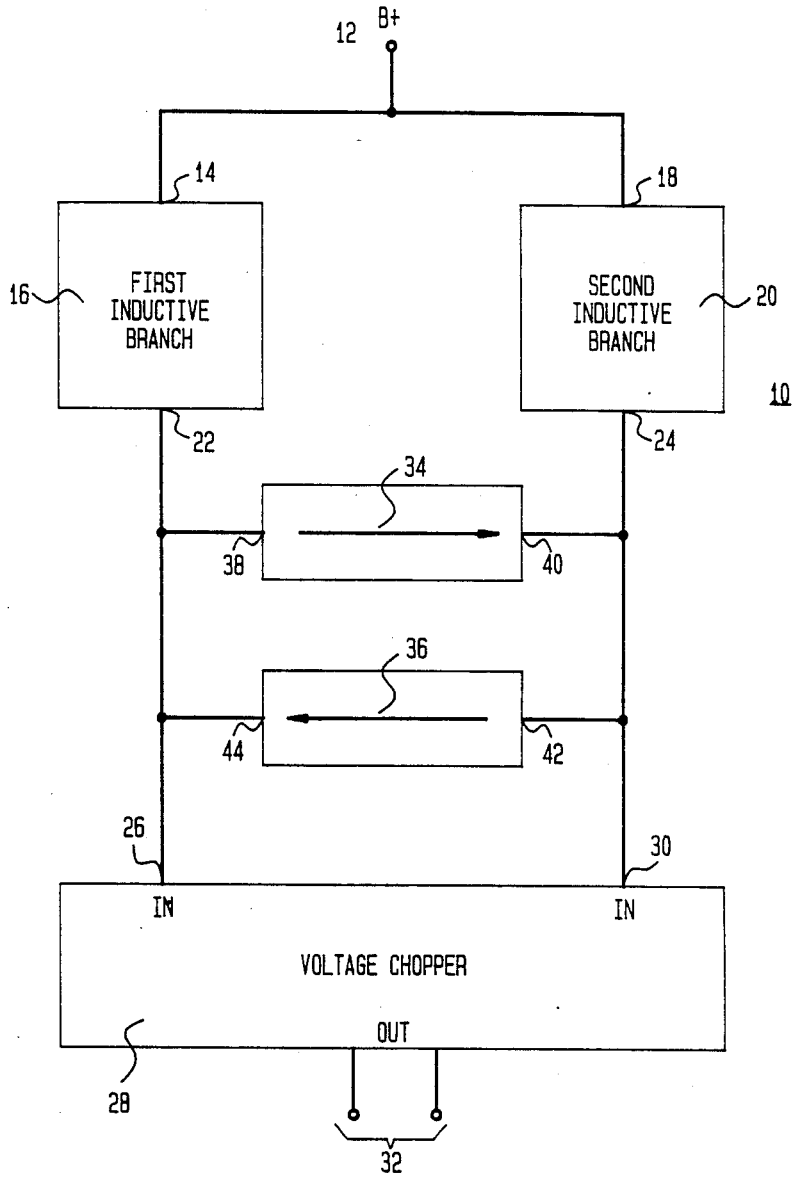
FIG. 1 is a block schematic diagram of the invention.

The structure and operation of the energy recoverable choke feed circuit can be best explained by reference to FIG. 1. The circuit 10 comprises four stages or subcircuits. Voltage is supplied to the circuit 10 at the input terminal 12. The input 14 of the first inductive branch 16 and the input 18 of the second inductive branch 20 are connected to the input terminal 12. The output 22 of the first inductive branch 16 is connected to the first input 26 of the voltage chopper circuit 28. The output 24 of the second inductive branch 20 is connected to the second input 30 of the voltage chopper circuit 28.

Two additional components need be mentioned. Shunting the outputs of the first and second inductive branches 16 and 20 are the first directional shunt circuit 34 and the second directional shunt circuit 36. The first directional shunt circuit input 38 and the second directional shunt circuit output 44 are connected to the output 22 of the first inductive branch 16 and the first input 26 of the voltage chopper circuit 28. The first directional shunt circuit output 40 and the second directional shunt circuit input 42 are connected to the output 24 of the second inductive branch 20 and similarly the second input 30 of the voltage chopper circuit 28.

The directional shunt circuits 34 and 36 have current limiting and voltage stabilizing ability. Otherwise, they behave as would a diode. The first directional shunt circuit 34 passes current from its input 38 to its output 40; the second directional shunt circuit 36 passes current from its input 42 to its output 44.

When the voltage chopper circuit is operating, one of its inputs is conductive while the other is not. Similarily, one of the inductive branches 16 or 20 is generally conducting while the other is not. When one of the inputs 26 or 30 switches off, the voltage at that input will rise due to the release of the energy in its corresponding inductive branch 16 or 20. As soon as a significant rise occurs, the energy is shunted through one of the directional shunt circuits 34 or 36 to the other side of the choke feed circuit 10 and into the voltage chopper circuit 28 through the corresponding input 26 or 30. In practice, as the inputs alternate between their on and off states, the directional shunt circuits 34 and 36 pass energy from one side to the other. Neglecting the resistive loss of the components in the circuit, an efficiency of nearly 100% can be achieved with this configuration.

Figure 2:
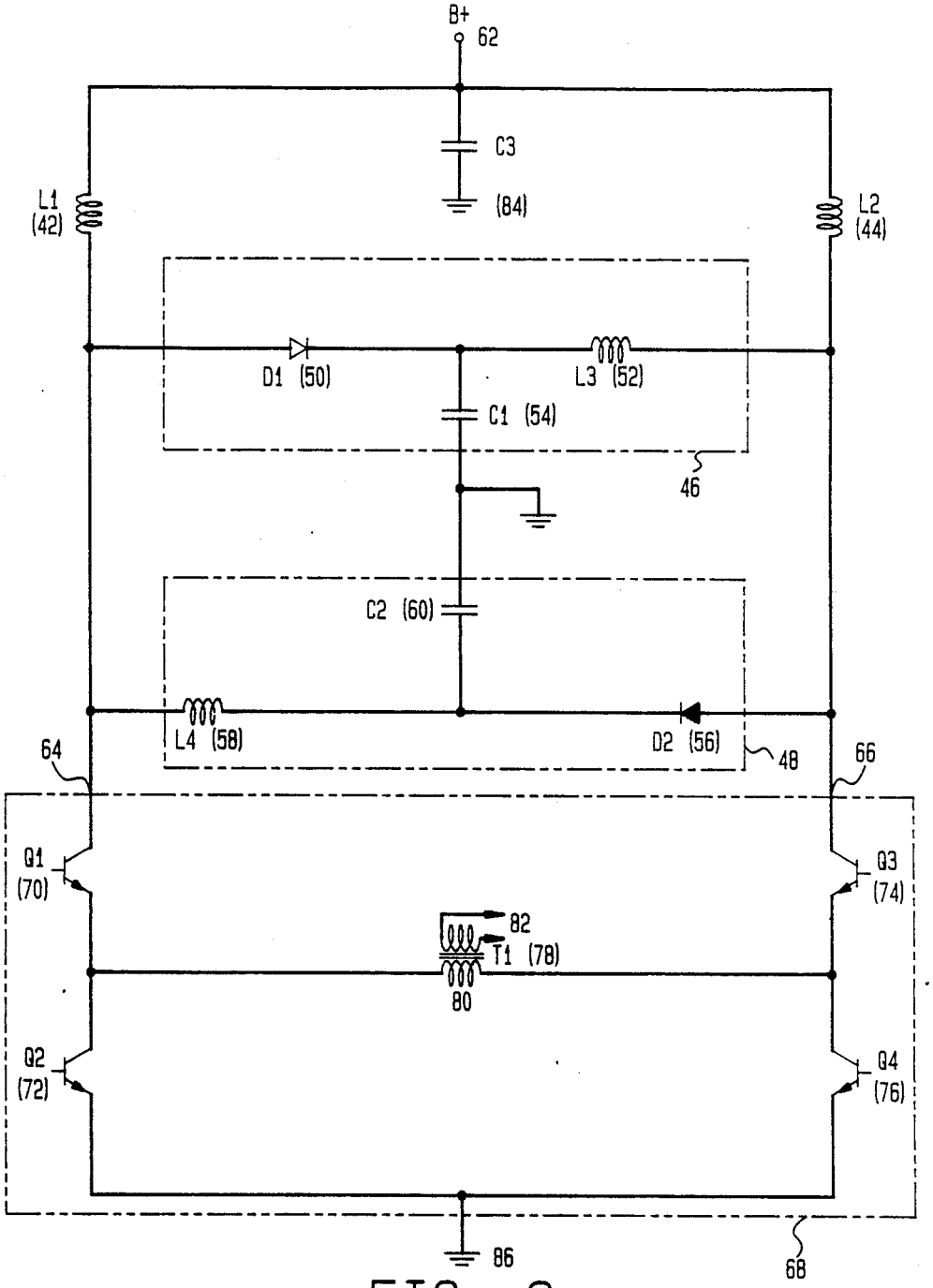
FIG. 2 is a detailed schematic diagram of the invention.

A practical embodiment of the energy recoverable choke feed is illustrated by the schematic diagram in FIG. 2. The inductors L1 and L2 (42 and 44, respectively) take the place of the first and second inductive branches 16 and 20 of FIG. 1. The first directional shunt circuit is illustrated by the dotted line box 46 and the second directional shunt circuit is illustrated by the second dotted line box 48. The first directional shunt circuit 46 comprises diode D1 (50), inductor L3 (52), and capacitor C1 (54); the second directional shunt circuit 48 comprises diode D2 (56), inductor L4 (58), and capacitor C2 (60). One side of each of the inductors L1 and L2 (42 and 44) are connected to the input terminal 62. Capacitor C3 (84), connected between the input terminal 62 and ground, provides voltage stabilization.

The other sides of the inductors L1 and L2 (42 and 44) are connected to either the first or second voltage chopper inputs 64 and 66, respectively. As in FIG. 1, the directional shunt circuits 46 and 48 are also connected at these points. Thus, with respect to the first directional shunt circuit 46, diode D1 (50) is connected at its anode to the input terminal 64 and at its cathode to inductor L3 (52). The other end of inductor L3 (52) is in turn connected to the second chopper input 66. At the junction of diode D1 (50) and inductor L3 (52) is capacitor C1 (54). The other side of capacitor C1 (54) is connected to ground. Diode D2 (56) takes its input at its anode from the junction of inductor L2 (44) and the second chopper input 66. The cathode of diode D1 (56) is connected to one end of inductor L4 (58), the other end of which is connected to the junction of inductor L1 (42) and the first chopper input 64. Connected at the junction of diode D2 (56) and inductor L4 (58) is capacitor C2 (60). The other side of capacitor C2 (60) is connected to ground.

For purposes of explanation, a simplified chopper circuit 68 is illustrated in FIG. 2. The active portion of the chopper circuit 68 comprises four transistors Q1 through Q4 (70, 72, 74, and 76, respectively). The collector of Q1 (70) is connected to the first chopper input 64. The emitter of Q1 (70) is connected to the collector of Q2 (72). The collector of Q3 (74) is connected to the second chopper input 66 while its emitter is connected to the collector of Q4 (76). The emitters of Q2 and Q4 (72 and 76, respectively) are connected to ground. The primary 80 of transformer T1 (78) is connected between the junctions of Q1 and Q2 (70 and 72) and Q3 and Q4 (74 and 76). The output, the secondary 82, of transformer T1 (78) provides the desired output A.C. voltage.

Figure 3:
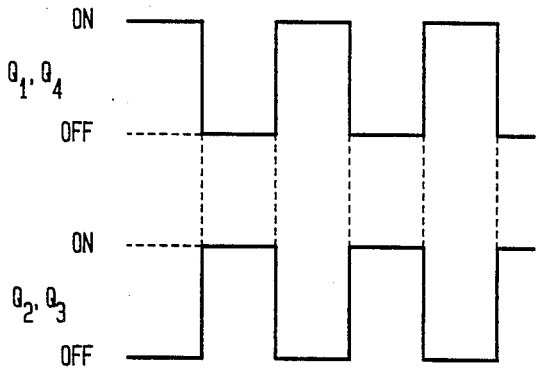
FIG. 3 is a waveform diagram of the operation of the timing circuitry for the voltage chopper circuit.

Not shown in the drawing is the driving circuit for the transistors Q1 through Q4. This circuit alternately activates Q1 and Q4 or Q2 and Q3. Thus, when Q1 and Q4 are switched on, Q2 and Q3 are off; when Q2 and Q3 are active, Q1 and Q4 are off. Such circuitry is well known to those skilled in the art. For purposes of further discussion, the driving circuitry can be thought to operate in accordance with the waveform diagrams shown in FIG. 3.

The operation of the complete circuit will now be discussed. At the end of an "on" cycle, for instance, when Q1 and Q4 switch off, the voltage at first chopper input 64 will begin to rise as the energy stored within inductor L1 (42) is released. Almost immediately, diode D1 (50) will begin to conduct. The released energy will then flow through diode D1 (50) and through inductor L3 (52) to the other input 66 of the voltage chopper circuit 68. For stability, capacitor C1 (54) provides voltage clamping. When Q2 and Q3 switch off and Q1 and Q4 again become active, the same process occurs on the opposite side of the circuit. The energy stored within inductor L2 (44) is released and the voltage at the second chopper input 66 begins to rise. Diode D2 (56) now begins to conduct and current will flow through the diode and through inductor L4 (58) towards the first chopper input 64. Similar to the operation of capacitor C1 (54), capacitor C2 (60) clamps the voltage in that network.

While there has been described what is believed to be the preferred embodiment of the invention, those skilled in the art will recognize that other and further modifications maybe made thereto without departing from the spirit of the invention, and it is intended to claim all such embodiments that fall within the true scope of the invention.

I claim:

1. An energy recoverable choke feed for a converter power supply having a voltage source and a voltage chopper circuit means for converting direct current voltage to alternating current voltage, comprising:
   - an input terminal connected to said voltage source;
   - first and second inductive branches, each having an input and an output, where said inputs of both of said inductive branches are connected to said input terminal;
   - first directional shunt means for passing current in a fixed direction connected between said outputs of said inductive branches;
   - second directional shunt means for passing current in a direction opposite to said first directional shunt means connected between said outputs of said inductive branches;
   - a first output terminal connected to said output of said first inductive branch; and
   - a second output terminal connected to said output of said second inductive branch, said first and second output terminals being connected to the first and second inputs, respectively, of said voltage chopper circuit means.

2. An energy recoverable choke feed circuit as set forth in claim 1 where said first and second inductive branches comprise inductive chokes.

3. An energy recoverable choke feed circuit as set forth in claim 2 above where said first and second directional shunt means comprise voltage clamping means.

4. An energy recoverable choke feed circuit as set forth in claim 3 above where said first and second shunt means further comprise current limiting means.

5. An energy recoverable choke feed circuit as set forth in claim 4 where said voltage clamping means comprises a capacitor.

6. An energy recoverable choke feed circuit as set forth in claim 5 above where said current limiting means comprises an inductor.

* * * * *